Dec. 19, 1972  E. P. GOFFINET, JR  3,706,719

PROCESS FOR THE POLYMERIZATION OF MONOMERS

Filed Oct. 6, 1971

INVENTOR
EDWARD P. GOFFINET, JR.

BY Raymond E. Blomstedt

ATTORNEY

United States Patent Office 3,706,719
Patented Dec. 19, 1972

3,706,719
PROCESS FOR THE POLYMERIZATION
OF MONOMERS
Edward P. Goffinet, Jr., Wilmington, Del., assignor to
E. I. du Pont de Nemours and Company, Wilmington,
Del.
Filed Oct. 6, 1971, Ser. No. 187,080
Int. Cl. C08f 15/40
U.S. Cl. 260—80.78  4 Claims

ABSTRACT OF THE DISCLOSURE

There is provided a process for the copolymerization of ethylene in a horizontal cylindrical evaporatively cooled reactor provided with a rotatable ribbon blender agitator having a set of outer ribbon blades pitched in a direction opposite to a set of inner ribbon blades.

Figure 1:
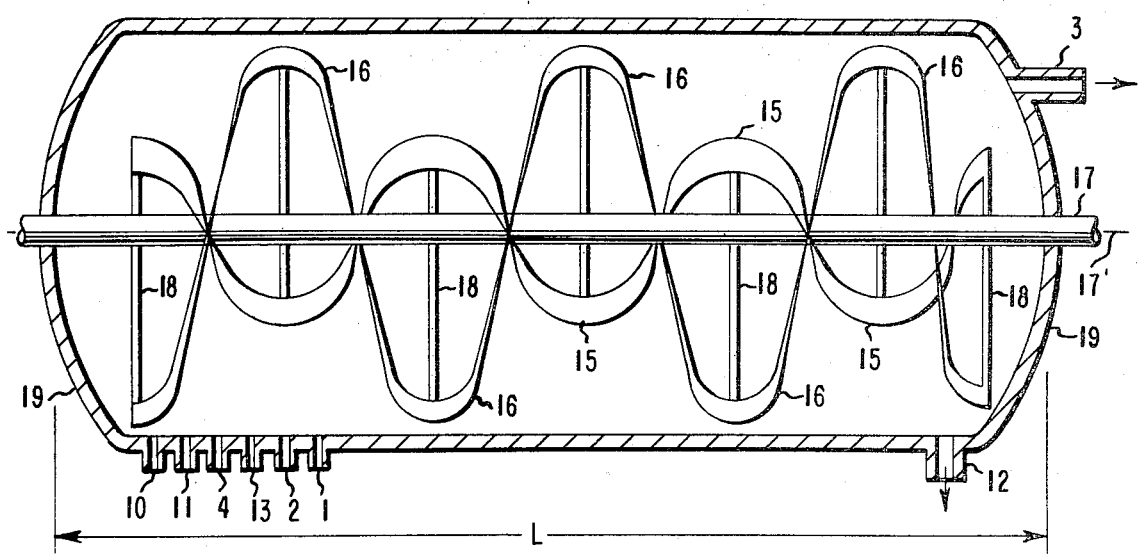

This invention relates to continuous polymerization of ethylene, and a $C_3$–$C_5$ alpha-olefin in an evaporatively cooled reactor.

The polymerization of monomers, such as ethylene, with one or more alpha-olefins, such as propylene, in solution using a coordination catalyst system is well known. The polymerization can be conducted continuously to obtain an ethylene copolymer, dissolved in a suitable solvent, which is isolated by conventional procedures. The most efficient of such processes are those which are based on increasing the concentration of polymer in the reactor in order to reduce the amount of solvent which has to be removed during isolation of the polymer product. However, an increase in polymer concentration leads to a relatively large increase in the solution viscosity. This in turn aggravates two problems: (1) the rate of mass transfer of ethylene from the gas to the liquid phase (i.e., ethylene mass transfer coefficient) is reduced, and (2) the rate of heat transfer to remove the large exothermic heat of polymerization is reduced.

The heat transfer problem can be solved economically by employing evaporative cooling wherein reaction heat is removed by evaporating ethylene and propylene monomers from the solution during the reaction and cooling and recycling them to the reaction mixtures. An evaporatively-cooled reactor has the disadvantage, however, that ethylene concentration in solution in the reactor is usually less than its equilibrium value. In order to produce a copolymer containing a particular proportion of ethylene, it is usually necessary to recycle a larger amount of ethylene in the reactor off-gas than would be the case if concentration of ethylene in solution in the reactor achieved its equilibrium value. Economically, this increase in recycle volume means greater expense than would otherwise be the case. There has been a need for a process for co-polymerizing ethylene in an evaporatively-cooled reactor whereby improved mass transfer of ethylene is provided and ethylene concentration in solution in the reactor is maintained at a value close to its equilibrium value even when the solution has a viscosity greater than about 500 centipoise (cp.).

There is provided by this invention an improved process for the solution polymerization of ethylene and at least one $C_3$–$C_5$ alpha-olefin in the presence of a coordination catalyst in an agitated evaporatively cooled reactor containing both a liquid and a vapor phase, the liquid phase having a solution viscosity greater than 500 cp. at the reaction conditions wherein at least a part of the off-gas from the reactor is compressed and condensed to form a liquid condensate, the condensate is partially vaporized to form a mixture of liquid and gas, and this mixture is re-cycled to the reactor. The improvement involves agitating the gas and liquid phases in a generally cylindrical reaction vessel having a horizontally aligned axis and a helical blade type agitator with at least two coaxial helical blades having oppositely directed pitches (reverse pitched blades) mounted coaxially on and at different radial distances from a rotatable horizontal shaft extending along the axis of the cylinder, the reaction vessel (reactor) being about 35–75% filled with liquid reaction mixture and the agitator speed being sufficient to provide an ethylene mass transfer coefficient equivalent to at least about 0.3 min.$^{-1}$ at a solution viscosity of less than about 5000 centipoise for a reactor of at least 5000 gallon (18,950 liters) capacity.

Referring to FIG. 1, which depicts a preferred embodiment of the reaction vessel utilized in the invention, horizontal reactor 14 is shown in cross-section, with cylindrical heads 19, vapor outlet port 3, product removal port 12, and inlet ports 1, 2, 4, 10, 11, and 13 for introduction of reactants and other reaction mixture components. The inlet ports can be fitted with dip tubes or sparge tubes to aid in distribution of feed reactants. The reactor can be constructed of materials well known in the art, such as carbon steel and stainless steel.

Reactor 14 is provided with a spiral agitator comprising a set of inner helical blades 15 pitched in a direction opposite to a set of outer helical blades 16 which move close to the reactor wall. Both sets of blades are mounted coaxially on a rotatable horizontal shaft 17. Members 18 provide support for the spirals. The agitator blades, shaft and supports can be fabricated of materials commonly used in the art. Typically, blades 15 and 16 are made from carbon or stainless steel, cast or machined to the proper shape; and welded or bolted to the shaft 17.

The polymers produced by the process of this invention are hydrocarbon soluble copolymers of ethylene (E) containing about 20–60% by weight of $C_3$–$C_5$ alpha-olefin units, such as propylene (P) units. Preferred are copolymers of ethylene containing about 25–50% propylene and 1–20% nonconjugated diene units by weight and preferably about 25–50% propylene and 2–10% diene by weight. By the term "hydrocarbon soluble copolymers" is meant that copolymer formed in the reactor is soluble at about —20° C. to about 80° C. in the polymerization solvent used in the reactor. The non-conjugated hydrocarbon diene utilized contains about 5–22 carbon atoms. Representative dienes are 1,4-hexadiene, dicyclopentadiene, 5-methylene - 2 - norbornene, 5-ethylidene-2-norbornene, and 1,5-cyclooctadiene. The general preparation of the copolymers produced by this invention are well known.

The process of this invention is carried out in a hydrocarbon solvent, preferably in a saturated linear hydrocarbon solvent containing about 5–8 carbon atoms such as pentane, hexane, and heptane. Compatible mixtures of solvents can also be employed. A coordination catalyst system of the type now well known is utilized. It should be noted that for each different catalyst combination a different P/E mole ratio in the solution in the reactor may be required to yield a given propylene content in the polymer. For each catalyst system there will exist a certain lower limit of the P/E mole ratio for the liquid monomers in the polymerization solution at which will be formed copolymer sufficiently high in ethylene content to be insoluble in the solvent. Preferred catalyst systems consist essentially of trisacetylacetonate (VAA)/ diisobutyl aluminum monochloride (DIBAC); vanadium tetrachloride (VCl$_4$)/DIBAC; vanadium oxytrichloride (VOCl$_3$)/diethyl aluminum ethoxide/DIBAC/benzotrichloride and VOCl$_3$/DIBAC. In using such catalysts, suitable aluminum to vanadium (Al/V) mole ratios and amounts of catalyst employed per liter of total solution will depend on the specific compounds and conditions employed. These are well known. Usually, Al to V mole ratios will fall within the range from about 2:1 to about 20:1. The amount of catalyst expressed as the amount of vanadium content usually ranges from about 0.00001 to 0.002 mole per liter of polymerization reaction mixture.

Coordination catalyst compositions containing compounds which enhance their activity, such as benzotrichloride, hexachloropropene, and the like can be employed. In using these adjuvants the Al/V ratio may be greatly increased and the vanadium concentration greatly reduced.

The temperature at which the polymerization reactor is operated will have some effect on the maximum amount of ethylene which can be tolerated in the polymer without the polymer's becoming insoluble in the polymerization solvent. While the polymerization reactor can be operated satisfactorily at temperatures ranging from about −20° C. to about +80° C., it is preferred that the reaction be conducted within the range of about 20° C. to about 60° C. Generally, the pressure is at least about 30 p.s.i., and preferably less than about 200 p.s.i. The pressure is dependent on the temperature and monomer concentrations in the reaction medium.

Ethylene can be fed to the reactor both as a vapor and as a liquid along with propylene in such amounts that the ratio of liquid propylene to liquid ethylene being fed to the reactor is high enough to produce a soluble polymer at the inlet port. There is no upper limit for P/E mole ratio in the liquid feed insofar as the elimination of insoluble polymer is concerned, but the P/E in the liquid feed need not be higher than the P/E mole ratio in the reactor liquid phase. A practical determination of the minimum P/E mole ratio in the liquid fed to the reactor under a given set of conditions can be made by setting up the continuous process with the desired amount of recycle of monomers stripped from the product, recycle of reactor off-gas, and make-up monomers, and running it with decreasing P/E mole ratios in the liquid feed to determine at which point substantial reactor inlet fouling occurs. It is preferred that the liquid being fed to the reactor have a P/E mole ratio of at least 3:1.

The process of the invention can be better understood by referring to FIG. 2 which is described below with respect to copolymerization of ethylene, propylene and 1,4-hexadiene. Vanadium tetrachloride (VCl₄) and diisobutyl aluminum monochloride [(i-C₄H₉)₂AlCl] are fed continuously as separate streams 21 and 22 to reactor A containing hexane solvent where the catalyst is formed in situ. 1,4-hexadiene is also continuously fed as stream 33 to reactor A. Polymer product, consisting essentially of copolymer in solution, unreacted monomers and catalyst, is continuously removed via stream 32 through control valve $CV_1$ which throttles the exit flow rate and maintains liquid volume in the reactor at approximately one-half the total volume. A portion of the more volatile components of the reaction mixture is withdrawn continuously as vapor stream 23 through a flow control valve $CV_2$ which is regulated by temperature sensor T. The vapor is passed through entrainment separator B, and the liquid portion returned to the reactor as stream 25. Gas in stream 24, is fed to compressor C, where it is compressed and then combined with fresh ethylene feed from stream 26, and fresh propylene feed from stream 27, before entering condenser D for partial condensation. The combined gas-liquid mixture from the condenser passes as stream 28 to control valve $CV_3$ where it is flashed into gas-liquid separator (E). Gas and liquid, streams 30 and 31, respectively, are returned to the reactor through nozzles placed in the liquid portion of the reactor. Inert gas is eliminated as stream 34.

The latent heat of vaporization of the recycle liquid and the sensible heat capacity of the vapor-liquid mixture provide a heat sink for the removal of the exothermic heat of polymerization. This method of cooling is referred to as evaporative cooling. Operating temperatures, pressures, stream compositions, and flow rates for the various streams shown in FIG. 2 are listed in Table 2. These operating conditions reflect the material balance, energy balance, reaction kinetics, and mass transfer characteristics of a vertical reactor for the production of 10,000 pounds of polymer per hour. The numerical values in Table 2 are calculated values since they can be calculated with greater precision than they can be measured. However, they are representative of conditions established in actual practice.

The reactor total volume is nominally 16,500 gallons (62,500 liters) based on a cylindrical vessel 11 feet (3.4 meters) diameter and 22 feet (6.7 meters) in height. The ungassed liquid volume in the reactor is 8250 gallons (31,200 liters); the liquid having a specific gravity of 0.66. The reactor is agitated by a conventional turbine type agitator with a vertical shaft and a speed of 80 r.p.m. and is also fitted with four equally spaced, radially oriented, vertical baffles attached to the wall of the reactor. Suitable ports for introduction of gas and liquid feeds and removal of liquid product are provided at the bottom of the vessel, and suitable ports are located at the top of the reactor for the removal of vapor.

Under the operating conditions listed in Table 2, the reaction mixture solution viscosity is 1250 cp. At this viscosity, the experimentally determined ethylene volumetric mass transfer coefficient, $K_La$, is 0.28 min.⁻¹ in accordance with the following equation:

$$K_La = \frac{\text{Ethylene flux}}{\left(\frac{1}{\alpha(P/E)_V} - \frac{1}{(P/E)_L}\right) X_p} \quad (1)$$

where:

Ethylene flux is the lb. moles of ethylene incorporated into the polymer per minute per lb. mole of polymer-free reaction mixture.

$(K_La)$ is the volumetric mass transfer coefficient for ethylene (min.⁻¹).

$\alpha$ is the relative volatility of ethylene to propylene.

$(P/E)_V$ is the molar ratio of propylene to ethylene in the vapor phase in the reactor.

$(P/E)_L$ is the molar ratio of propylene to ethylene in the liquid phase in the reactor.

$X_p$ is the mole fraction of propylene in the polymer-free reactor solution.

This equation can be used: (1) to *correlate* actual data on reactor operating conditions such as that shown in Table 2 to obtain a value of $(K_La)$ useful for design purposes; and (2) to *design* a reactor for new conditions in which $(P/E)_V$ is calculated from known values of all other factors including $(K_La)$.

The following examples illustrate these two possibilities:

(1) Calculation of $(K_La)$ from reactor operating conditions

In the example shown in Table 2, the polymer production rate is 10,000 lb./hr. (4540 kg./hr.) and the ethylene content of the polymer is 64 weight percent. The average molecular weight of the polymer-free reactor solution (stream 32 after separation of polymer) is $$\frac{91,640 - 10,000}{1,322 - 290.5} = 79.1 \text{ lb./hr. mole polymer-free solution}$$

The ethylene flux is:

$$\text{Ethylene flux} = \frac{(10,000)(.64)}{(60)(28)}$$

$$\left(\frac{(8250)(.66)(8.33)}{79.1}\right) = 0.00665 \text{ min.}^{-1}$$

The relative volatility of ethylene to propylene at 30° C. is 4. From Table 2, stream No. 32, $$X_P = \frac{143.2}{1322 - 290.5} = 0.139$$

and the value of $$(P/E)_L = \frac{143.2}{18.0} = 7.96$$

For stream No. 23, the value of $$(P/E)_V = \frac{1845.2}{2196.6} = 0.840$$

From these data, the value of ($K_La$) can be calculated from Equation 1 as follows:

$$0.00665 = K_La \left(\frac{1}{(4)(0.840)} - \frac{1}{7.96}\right)(0.139)$$

$$K_La = 0.28 \pm 10\%$$

(2) Calculations of $(P/E)_V$ for new reactor conditions

Assume that ($K_La$) is known for a new production rate from previous correlations of the reactor performance. The polymer production rate and its composition are chosen and from previously established correlations of the kinetics of polymerization $(P/E)_L$ is fixed. The average molecular weight of the polymer-free solution is then calculated from the reactor solution composition. This leaves $(P/E)_V$ to be obtained from Equation 1. This is the actual procedure followed in calculating $(P/E)_V$ which is shown in Table 2 as stream 23. The magnitude of the flow rates of each of the components in stream 23 is determined from the heat evolved in forming the polymer and the heat capacities and heat of evaporation of unit amounts of each of the components in stream 23. The fraction of the gas from stream 23 which is condensed in the partial condenser (D), depends on the temperature, pressure, and composition of the compressed vapor. For the conditions shown in Table 2, the fraction condensed in (D) is 48 mole percent. The required recycle coolant flow rate is 18 lb. of reactor off-gas per pound of polymer produced.

In operating the vertical reactor, as described above, the reactor fouls frequently, averaging once per day, because the condensate returned to the reactor is overly rich in its coolant of ethylene. As shown in Table 2, this condensate in stream 31 contains 12.1 mole percent ethylene and 47.2 mole percent propylene yielding a P/E in the liquid feed of 3.9. At a reaction temperature of 30° C., such a P/E value causes reactor fouling by producing insoluble products. To cope with such reactor fouling, operation of the reactor must be stopped and the reactor cleaned, preferably by heating and flushing with fresh solvent. Alternatively, fouling can be prevented by decreasing the ethylene content and increasing the propylene content of the condensate from condenser D. Fouling is more conveniently prevented in accordance with the instant invention, by using a horizontal reactor as described below, whereby a greater ethylene mass transfer coefficient is realized with the result that the reactor vapors in stream 23, are relatively richer in propylene.

In order to obtain an improved rate of mass transfer of ethylene from the vapor to the liquid phase in a reactor containing ethylene and propylene, it is necessary to observe certain design criteria for the reactor and agitator. The length of the reactor should be two to four times its diameter. The choice of design parameters for the inner and outer spiral agitator blades, shown in Table 1, are not independent of each other but are selected so that the volumetric pumping capacity in the axial direction of the inner and outer sets of blades are approximately equal and opposite.

TABLE 1

[Preferred specifications for agitator]

| | Outer set of blades | Inner set of blades |
|---|---|---|
| Number of blades | About 4 to about 12. | About 4 to about 12. |
| Blade width [1] | About 0.025 to about 0.10. | About 0.04 to about 0.20. |
| Diameter of agitator to outer blade edge.[2] | About 0.80 to about 0.95. | About 0.40 to about 0.75. |
| Pitch of blades [3] | 16 L to 4 L | $-2L$ to $-\frac{L}{2}$. |

[1] Blade width is expressed as a fraction of the vessel diameter.
[2] The diameter of the circle described by the rotation of the agitator is measured to the outer edge of the agitator blade as a fraction of vessel diameter.
[3] Pitch of the agitator blade is measured as the length L of a vessel required to cause one complete revolution of the agitator. The negative sign on the pitch indicates that the pitch of the inner spiral is opposite to that of the outer spiral.

TABLE 2

[Operating conditions for production of 10,000 lb./hr. (4,540 kg./hr.) EPDM terpolymer in a vertical turbine-agitated reactor—Example 1]

| | Stream | | | | | | | | | | | | |
|---|---|---|---|---|---|---|---|---|---|---|---|---|---|
| | 21 | 22 | 23 | 24 | 25 | 26 | 27 | 28 | 29 | 30 | 31 | 32 | 33 |
| Phase | Liq. | Liq. | Gas | Gas | Liq. | Gas | Liq. | Gas | Liq. | Gas | Liq. | Liq. | Liq. |
| Flow rate, lb.-moles/hr.: | | | | | | | | | | | | | |
| Nitrogen | | | 91.9 | 91.9 | | | | 87.6 | 4.3 | 91.7 | .2 | | |
| Ethylene | | | 2,196.6 | 2,195.7 | 0.9 | 247.6 | | 1,624.6 | 818.7 | 2,323.4 | 119.2 | 18.0 | |
| Propylene | | | 1,845.2 | 1,841.3 | 3.9 | | 219.7 | 847.3 | 1,213.7 | 1,595.5 | 465.5 | 143.2 | |
| Hexane | 418.5 | 441.7 | 454.4 | 417.4 | 37.0 | | | 18.4 | 399.0 | 20.8 | 396.6 | 860.2 | |
| Hexadiene | | | 4.9 | 4.5 | .4 | | | .2 | 4.3 | .2 | 4.3 | 9.2 | 14.1 |
| Polymer | | | | | | | | | | | | 290.5 | |
| VCl₄ | .16 | | | | | | | | | | | .16 | |
| (i-C₄H₉)₂AlCl | | .80 | | | | | | | | | | .80 | |
| Kg.-moles/hr | 190 | 202 | 2,080 | 2,070 | 19.2 | 112 | 116 | 1,170 | 1,110 | 1,830 | 444 | 605 | 6.4 |
| Lb.-moles/hr | 418.7 | 442.5 | 4,593 | 4,551 | 42.2 | 247.6 | 219.7 | 2,578 | 2,440 | 4,031 | 987 | 1,322 | 14.1 |
| Kg./hr | 16,400 | 17,350 | 82,200 | 80,900 | 1,560 | 3,160 | 4,160 | 38,800 | 49,500 | 62,200 | 26,100 | 41,600 | 525 |
| Lbs./hr | 36,093 | 38,201 | 181,423 | 177,992 | 3,431 | 6,944 | 9,244 | 85,279 | 108,902 | 136,902 | 57,494 | 91,640 | 1,158 |
| Temp. °C | 10 | 10 | 30 | 30 | 30 | 25 | 25 | 40 | −7.8 | 40 | −7.8 | 30 | 25 |
| Pressure (p.s.i.g.) | 150 | 150 | 25 | 25 | 25 | 450 | 450 | 450 | 450 | 65 | 65 | 25 | 150 |

The invention permits preparation of copolymers, especially ethylene/propylene copolymers, whose utility as valuable elastomers is well known, by an improved process which affords increased reactor capacity with a minimum of reactor fouling. Polymer of excellent quality can be produced with good catalyst efficiency.

The operation of the process of this invention is illustrated by the following examples in which all parts, proportions, and percentages are by weight unless otherwise indicated.

EXAMPLE 1

Vertical reactor with a turbine-type agitator

Figure 2:
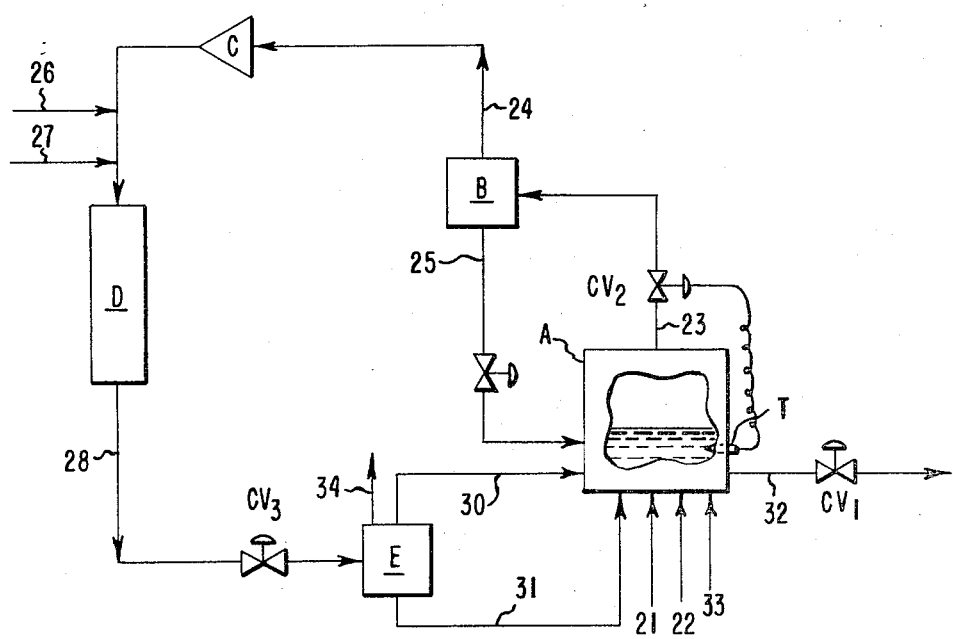

A conventional vertical, cylindrical, turbine-agitated reactor is used in accordance with the process shown in FIG. 2 for the copolymerization of ethylene, propylene and 1,4-hexadiene in solution to produce an 11 weight percent solution of ethylene/propylene/1,4-hexadiene (EPHD) terpolymer in the reactor effluent. The terpolymer contains 32 percent propylene, 64 percent ethylene, and 4 percent 1,4-hexadiene; the molecular weight of the terpolymer as measured by Mooney viscosity (ML-4 at 250° F.) is 45.

EXAMPLE 2

Horizontal reactor with a reverse-pitch spiral-type agitator

A horizontal cylindrical vessel with a double spiral reverse-pitch agitator as shown in FIG. 1 is used for comparative purposes to polymerize the same monomers in the same proportions as described in Example 1, using the process of FIG. 2. The reactor total volume is 16,500 gallons (62,500 liters) based on a cylindrical vessel nominally 11 feet (3.3 meters) in diameter and 22 feet (6.6 meters) long. The ungassed liquid volume is 8,250 gallons (31,300 liters). The agitator consists of an outer set of eight ribbon blades and an inner set of six ribbon blades mounted coaxially on a horizontal shaft running the length of the reactor. The outer set of eight blades are equally spaced on a 360° circle with an outer diameter of ten feet (3 meters). Each of the outer blades is six inches (0.15 meter) wide and makes one-eighth turn over the length of the vessel. The inner set of six blades are equally spaced on a 360° circle with an outer diameter of 5.5 feet (1.8 meters). Each of the inner blades is nine inches (22.8 cm.) wide and makes one full turn in the length of the vessel but in the opposite direction from the outer blades when viewed from either end of the vessel. Agitator speed is 35 r.p.m.

Suitable ports are provided in vessel 14, FIG. 1, for: (a) inlets for gas and liquid feeds below the liquid surface (1, 2, 4, 10, 11, and 13); (b) seals for the agitator shaft; (c) an outlet for the vapor 3; and (d) an outlet for the polymer solution 12.

The operating temperatures, pressures, stream compositions and flow rates for this reactor system are presented in Table 3. Reaction conditions are shown for the production of 10,000 lbs./hr. (4540 kg./hr.) of ter- The precision of the coefficients in Table 3 is ±40%.

For the plant conditions specified in Table 4, the reactor solution viscosity in stream 12 is 1250 cp. The ethylene mass transfer coefficient for the horizontal reactor is 1 min.$^{-1}$ which is almost four times greater than the value (0.28 min.$^{-1}$) measured for the vertical turbine-agitated reactor.

Advantage of the horizontal reactor compared to the vertical reactor

The propylene content of the off-gas in stream 23 from the horizontal reactor is 50.9 mole percent compared to only 40.2 mole percent from the vertical reactor. The increased content of propylene in the reactor off-gas means that 65 mole percent of the compressed vapor from (C) can be condensed in (D) for the same compressor and condenser operating conditions as used for the vertical reactor in Example 1. As a result, the coolant flow rate, stream 23, is reduced to 13 pounds of vapor per pound of polymer. The propylene content of the condensate produced from the condenser (D) in stream 28 (Table 3) is 57.4 mole percent for the horizontal reactor as compared to 49.8 mole percent for the vertical reactor (stream 28 in Table 2). Fouling of the horizontal reactor is practically eliminated because of the decreased ethylene content of the condensate from the condenser (D). In addition, the improved mass transfer coefficient is advantageous in reducing compressor size, investment and operating costs.

TABLE 4

[Operating conditions for production of 10,000 lb./hr. EPDM terpolymer in a horizontal agitated reactor—Example 2]

| | Stream | | | | | | | | | | | | |
|---|---|---|---|---|---|---|---|---|---|---|---|---|---|
| | 21 | 22 | 23 | 24 | 25 | 26 | 27 | 28 | 29 | 30 | 31 | 32 | 33 |
| Phase | Liq. | Liq. | Gas | Gas | Liq. | Gas | Liq. | Gas | Liq. | Gas | Liq. | Liq. | Liq. |
| Flow rate, lb. moles/hr.: | | | | | | | | | | | | | |
| Nitrogen | | | 63.6 | 63.6 | | | | 57.9 | 5.7 | 63.3 | .3 | | |
| Ethylene | | | 1,181.1 | 1,180.3 | .8 | 247.6 | | 709.4 | 718.5 | 1,292.6 | 135.3 | 18.0 | |
| Propylene | | | 1,618.1 | 1,613.6 | 4.5 | | 219.7 | 476.0 | 1,357.3 | 1,135.3 | 698.0 | 143.2 | |
| Hexane | 418.5 | 441.7 | 314.7 | 283.7 | 31.0 | | | 6.6 | 277.1 | 6.7 | 277.0 | 860.2 | |
| Hexadiene | | | 3.4 | 3.1 | .3 | | | .1 | 3.0 | .1 | 3.0 | 9.2 | 14.1 |
| Polymer | | | | | | | | | | | | 290.5 | |
| VCl$_4$ | .16 | | | | | | | | | | | .16 | |
| (i-C$_4$H$_9$)$_2$AlCl | | .80 | | | | | | | | | | .80 | |
| Total, lb. moles/hr | 418.7 | 442.5 | 3,181 | 3,144 | 36.6 | 247.6 | 219.7 | 1,250 | 2,362 | 2,498 | 1,114 | 1,322 | 14.1 |
| Lbs./hr | 36,093 | 38,201 | 130,407 | 127,474 | 2,933 | 6,944 | 9,244 | 42,114 | 101,548 | 86,374 | 57,288 | 91,640 | 1,158 |
| Temperature | 10 | 10 | 30 | 30 | 30 | 25 | 25 | 40 | 40 | −14.4 | −14.4 | 30 | 25 |
| Pressure (p.si.g.) | 150 | 150 | 25 | 25 | 25 | 450 | 450 | 450 | 450 | 65 | 65 | 25 | 150 | polymer containing 32 weight percent propylene, 64 weight percent ethylene, and 4 weight percent 1,4-hexadiene at a Mooney viscosity of 45 (ML-4 −250° F.) in an 11 weight percent hexane solution withdrawn from the reactor.

The ethylene mass transfer coefficient in EPDM polymerization depends on solution viscosity. Table 3 shows values of the coefficient at various solution viscosities for a prototype of the horizontal reactor given in Example 2.

TABLE 3

Ethylene mass transfer coefficient in the above horizontal reactor with a double-spiral reverse pitch agitator

| Viscosity (cp.): | Ethylene mass transfer coefficient, $K_L a$ (min.$^{-1}$) |
|---|---|
| 500 | 1.7 |
| 1000 | 1.2 |
| 2000 | 0.80 |
| 3000 | 0.65 |
| 4000 | 0.55 |
| 5000 | 0.50 |

What is claimed is:

1. In a continuous process for solution polymerization of ethylene and at least one C$_3$–C$_5$ alpha-olefin in the presence of a coordination catalyst system in an evaporatively cooled reactor containing a vapor phase and a liquid phase with a solution viscosity greater than about 500 centipoises wherein vapor is removed from the reactor and partially condensed to form a liquid/vapor mixture which is recycled to the liquid phase of the reactor, the improvement of agitating the vapor and liquid phases in a horizontal reactor by revolving therein an agitator having a horizontal rotatable shaft and at least two reverse-pitched coaxial helical blades attached to said shaft at different radial distances therefrom, the reactor being about 35–75% filled with liquid reaction mixture and the agitator speed being sufficient to provide an ethylene mass transfer coefficient equivalent to at least about 0.3 min.$^{-1}$ at a solution viscosity less than about 5000 centipoises for a reactor capacity of at least 5000 gallons.

2. The process of claim 1 in which the alpha-olefin is propylene.

3. The process of claim 2 in which ethylene, propylene and a non-conjugated diene are polymerized.

4. The process of claim 3 in which the diene is 1,4-hexadiene.

References Cited

UNITED STATES PATENTS

| | | | |
|---|---|---|---|
| 2,963,470 | 12/1960 | Lanning | 260—88.2 |
| 3,300,457 | 1/1967 | Schmid | 260—88.2 |
| 3,330,818 | 7/1967 | Derby | 260—94.9 |
| 3,524,730 | 8/1970 | Yokouchi | 23—285 |
| 3,567,402 | 3/1971 | Christensen | 23—285 |

JAMES A. SEIDLECK, Primary Examiner

R. S. BENJAMIN, Assistant Examiner

U.S. Cl X.R.

23—285, 288 E; 260—88.2 R